United States Patent
Marquardt et al.

(10) Patent No.: US 9,787,707 B1
(45) Date of Patent: Oct. 10, 2017

(54) NETWORK SECURITY ANALYSIS SYSTEM

(71) Applicant: Accenture Global Solutions Limited, Dublin (IE)

(72) Inventors: Edward Marquardt, Dover, NH (US); Vikram K. Desai, Greenwich, CT (US); Patrick J. Joyce, Wilmington, MA (US); Brandon Whiteman, Burke, VA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/457,340

(22) Filed: Mar. 13, 2017

Related U.S. Application Data

(60) Provisional application No. 62/368,650, filed on Jul. 29, 2016.

(51) Int. Cl.
*H04L 29/06* (2006.01)
*G06F 17/30* (2006.01)

(52) U.S. Cl.
CPC .... *H04L 63/1425* (2013.01); *G06F 17/30958* (2013.01)

(58) Field of Classification Search
CPC ................ H04L 63/1425; G06F 17/30958
See application file for complete search history.

(56) References Cited

U.S. PATENT DOCUMENTS

| | | | |
|---|---|---|---|
| 7,114,183 B1* | 9/2006 | Joiner | H04L 43/045 713/188 |
| 8,694,305 B1* | 4/2014 | Grove | G06F 17/28 704/1 |
| 8,713,141 B1* | 4/2014 | Liu | H04L 43/045 709/223 |
| 2005/0021683 A1* | 1/2005 | Newton | H04L 12/2602 709/220 |
| 2010/0046377 A1* | 2/2010 | Ryan | H04L 41/0681 370/241 |
| 2012/0173931 A1* | 7/2012 | Kube | G05B 23/0256 714/37 |
| 2014/0165195 A1* | 6/2014 | Brdiczka | G06F 21/552 726/23 |
| 2014/0282871 A1* | 9/2014 | Rowland | H04L 63/20 726/3 |

(Continued)

OTHER PUBLICATIONS

Hohn, Nicolas et al., "Cluster Processes: A Natural Language for Network Traffic", IEEE Transactions on Signal Processing, Vol. 51, No. 8, Aug. 2003, pp. 2229-2244.*

(Continued)

*Primary Examiner* — Michael Pyzocha
(74) *Attorney, Agent, or Firm* — Brinks Gilson & Lione

(57) ABSTRACT

A network security analysis system performs anomaly detection with low false positives by implementing a multiple perspective analysis of network data. The analysis system takes a new approach to defining the network baseline, using, as examples, topic modeling and time series algorithms. The analysis system implements natural language processing techniques to examine the content of network and time series data to establish and maintain a definition of the baseline network state model, against which new activity is compared to identify anomalies.

20 Claims, 16 Drawing Sheets

(56) References Cited

U.S. PATENT DOCUMENTS

| | | | |
|---|---|---|---|
| 2015/0009038 A1* | 1/2015 | Trossbach, Jr. | G08B 5/22 340/691.6 |
| 2015/0019203 A1* | 1/2015 | Smith | G06F 17/30796 704/9 |
| 2015/0085679 A1* | 3/2015 | Farkas | H04L 5/0051 370/252 |
| 2015/0113651 A1* | 4/2015 | Kim | H04L 63/1425 726/24 |
| 2016/0112443 A1 | 4/2016 | Grossman et al. | |
| 2016/0124999 A1* | 5/2016 | Gonzalez Brenes | G06F 17/30297 707/803 |
| 2016/0217022 A1* | 7/2016 | Velipasaoglu | G06F 11/079 |
| 2016/0219078 A1* | 7/2016 | Porras | G06F 9/4443 |
| 2016/0373308 A1* | 12/2016 | Mullarkey | H04L 41/142 |

OTHER PUBLICATIONS

"*Common Vulnerability Scoring System v3.0: Specification Document,*" https://www.first.org/cvss/specification-document. (21p). Jun. 2015.

\* cited by examiner

Figure 15

NETWORK SECURITY ANALYSIS SYSTEM

PRIORITY CLAIM

This application claims priority to, and incorporates by reference, U.S. provisional application Ser. No. 62/368,650, filed Jul. 29, 2016.

TECHNICAL FIELD

This application relates to security systems, including security systems for computer networks. This application also relates to threat analysis, identification, review, and resolution in security systems.

BACKGROUND

The processing power, memory capacity, available disk space, and other resources available to computer systems have increased exponentially in recent years. Interconnected networks of computer systems are deployed in almost every conceivable application worldwide and carryout an immense variety tasks ranging from the mundane to mission critical. Improvements in security for these systems will enhance the protection of these systems against compromise, whether intentional or unintentional.

BRIEF DESCRIPTION OF THE DRAWINGS

FIGS. 5-15 show examples of alerting and analysis graphical user interfaces.

DETAILED DESCRIPTION

A network security analysis system ("system") implements a high speed and high data volume analytical framework ingesting and analyzing a wide variety of network data, such as NetFlow data, DNS data, and security information and event management (SIEM) data. The system detects, categories, and reports anomalous activity. The system implements natural language processing (NLP) techniques that examine the content of network and time series analyses to establish and maintain a baseline (e.g., "normal" or nominal) network state model. The system performs its analysis over a multi-dimensional perspective of network activity.

Figure 1:
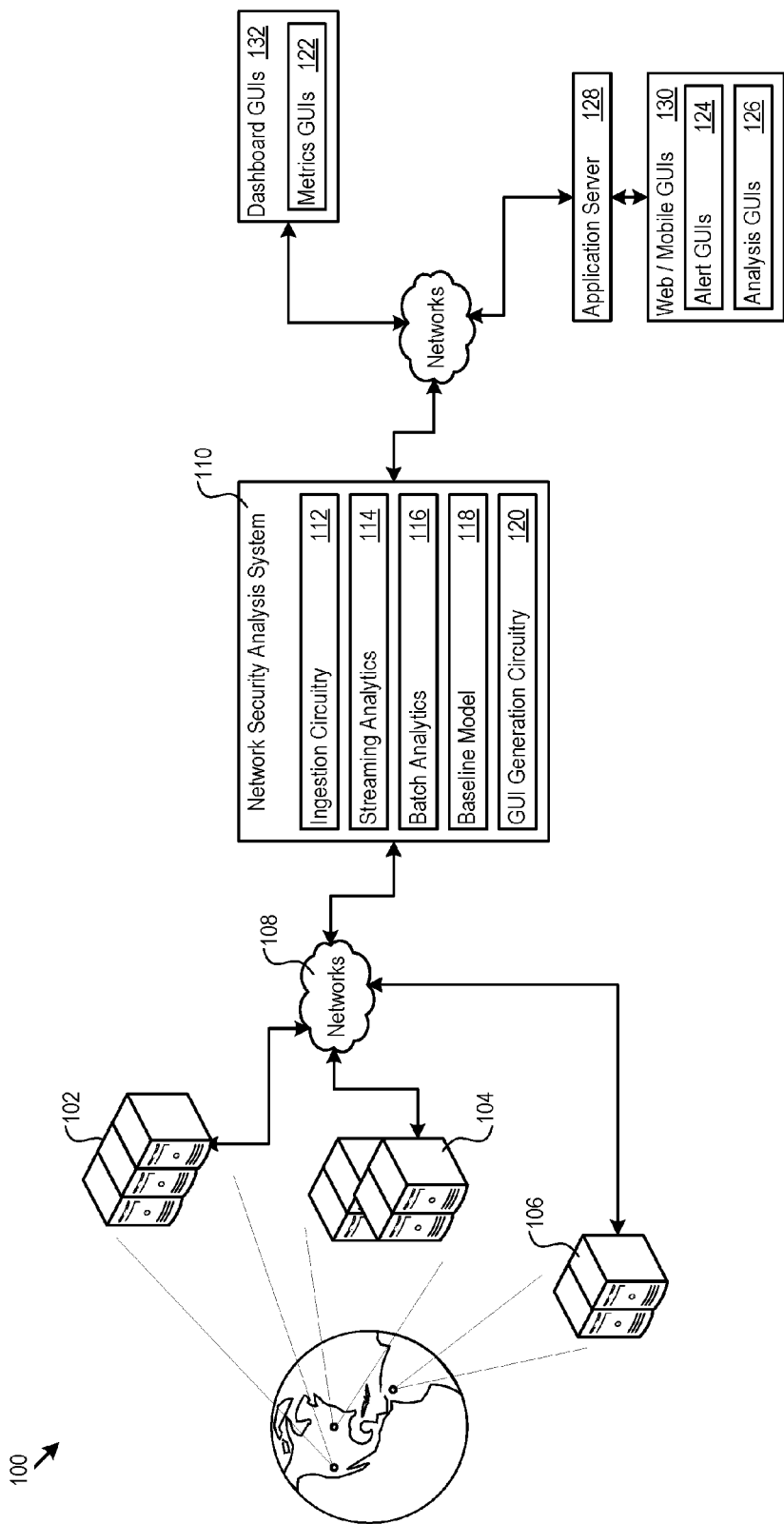
FIG. 1 shows a network security analysis system in communication with enterprise locations submitting network data for analysis.
Figure 2:
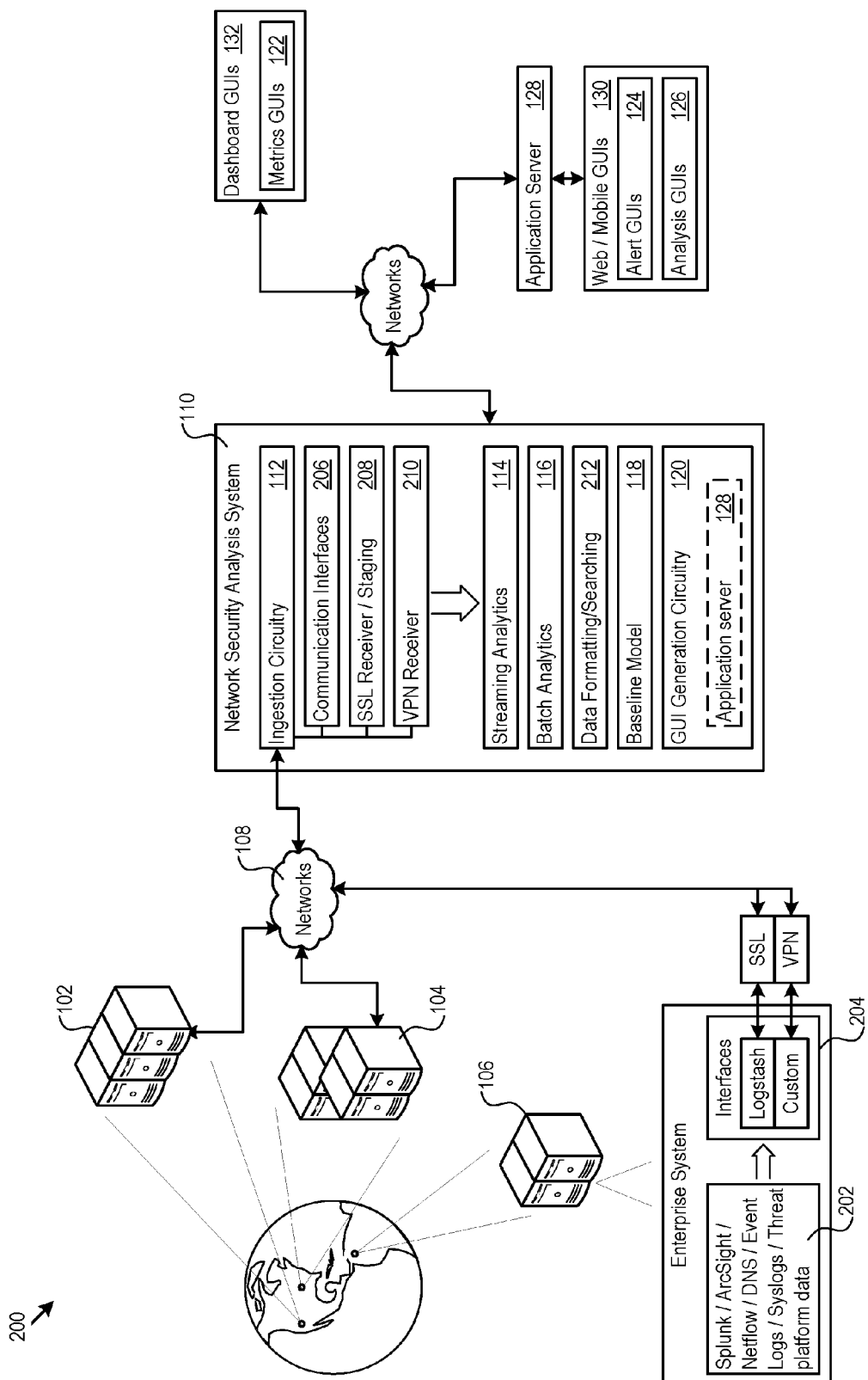
FIG. 2 shows another view of the network security analysis system in communication with the enterprise locations.
Figure 3:
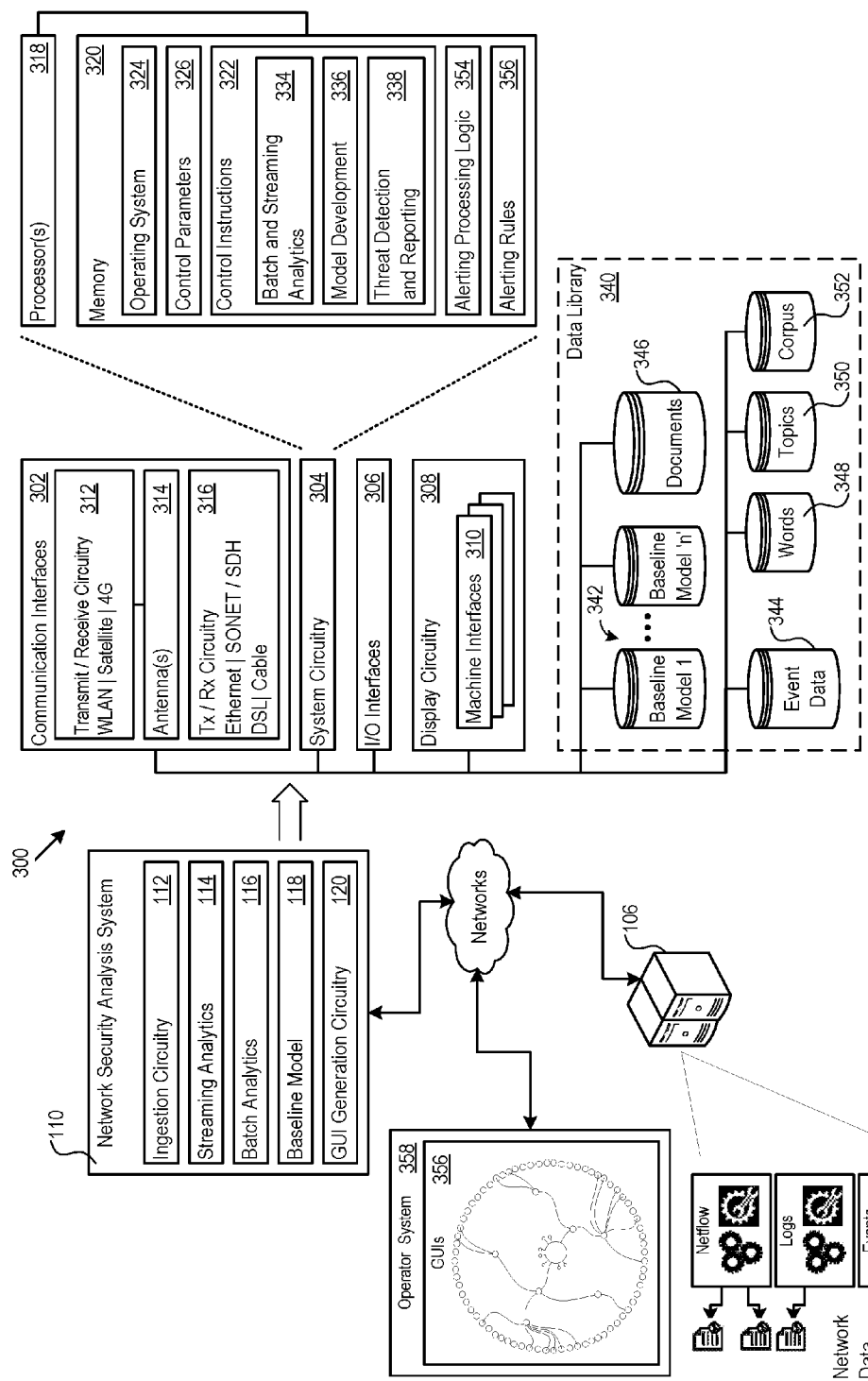
FIG. 3 shows an example implementation of the network security analysis system.

FIGS. 1-3 provide an example context for the discussion below of the technical solutions in the system. That is, FIGS. 1-3 are specific examples out of many possible different implementations and implementation contexts. In that respect, the technical solutions are not limited in their application to the architectures and systems shown in any of the Figures discussed below, but are applicable to many other system implementations, architectures, user interfaces, and connectivity.

FIG. 1 shows an example 100 of geographically distributed enterprise systems 102, 104, and 106 connected through networks 108. The networks 108 may include private and public networks defined over, for instance, any pre-determined and possibly dynamic internet protocol (IP) address ranges. The enterprise systems 102-106 includes individual physical and virtual machines that host and execute any number of applications of any type. The machines are typically connected together by an enterprise network for the specific enterprise. When an enterprise is concerned with network security, the enterprise may subscribe to and receive network security analysis provided by the network security analysis system 110. In other implementations, the network security analysis system 110 is implemented within the enterprise itself, rather than as an external service.

The system 110 performs complex technical security analyses for the enterprises. As an overview, the system 110 includes system circuitry that implements ingestion circuitry 112, streaming analytics engines 114 and batch analytics engines 116. The system circuitry also creates, trains, and maintains a baseline network model 118. The baseline network model 118 is a purposefully constructed characterization of a selected enterprise network(s), and represents the nominal or "normal" activity set on the selected enterprise network. The system 110 updates the baseline network models over time to ensure that they evolve and continue to match the nominal activity profile of the enterprise network. The baseline network models 118 thereby provide a reference point against which the system 110 may compare ongoing network activity to determine network anomalies within the enterprise.

The system circuitry also includes interface generation circuitry 120. The interface generation circuitry 120 renders and delivers system interfaces to any endpoint, such as web portals, smartphone applications, or proprietary enterprise review and control systems. Examples of system interfaces include network metrics reporting graphical user interfaces (GUIs) 122, alert GUIs 124, and analysis GUIs 126. The system 110 may render and deliver the system interfaces in a wide variety of manners. As one example, the system interfaces may be available through application servers 128 that communicate network (e.g., web browser), mobile, or other types of interfaces 130 to connected computers or smartphone clients. As another example, the system interfaces may be available through a dashboard interface system 132 in a secure location within the enterprise that renders security dashboards including metrics, alerts, analysis interfaces, or other interface elements.

FIG. 2 shows another view 200 of the enterprise systems 102-106 and the system 110. In this example, the enterprise system delivers network data 202 through data interfaces 204 to the system 110, e.g., through secure socket layers (SSLs), via virtual private networks (VPNs), HTTPs, or through other connections. The network data 202 may include a wide variety of data characterizing or reporting on the enterprise network. A few examples of network data 202 include Netflow data (e.g., packet and connection data), event logs, system logs, application logs, database logs, threat software data, operational intelligence, machine data that includes records of the activity and behavior of network customers and users, as well as activity and behavior records of transactions, applications, servers, networks and mobile devices on the network. As additional examples, the network data 202 may include data on machine configurations, web access logs, operating system events, message queues, change events, diagnostic command output, transaction records such as call detail records, and sensor data. Much of the network data 202 is expressed in a textual form that follows natural language semantics. As will be described in more detail below, the system 110 executes NLP processing techniques on the network data 202 to derive network security insights from the network data 202.

Within the system 110, the ingestion circuitry 112 accepts the connections from the enterprise systems and receives the network data 202 for analysis. As one example, the ingestion circuitry 112 may include a communication interface 206, e.g., Ethernet ports, or WiFi interfaces. The ingestion circuitry 112 includes receivers adapted for communication with the enterprise systems, such as SSL receivers 208 and VPN receivers 210. The streaming analytics engines 114 may, for instance, implement Spark streaming processing and open network insight (ONI) streaming processing. The batch analytics engines 116 may implement, e.g., a Cloudera™ batch analytics platform running Spark based latent dirichlet allocation (LDA) processing for analyzing the network data 202. The system 110 may also implement data formatting, searching, analysis and visualization processors 212, such as Elasticsearch™ processors.

FIG. 3 shows an example implementation 300 of the system 110. The system architecture may vary widely, and may be based on, for instance, an Intel Xeon processor E7-8800/4800 v3 product platform for real-time analytics and fast processing of volume data workloads. The example implementation 300 includes communication interfaces 302, system circuitry 304, and input/output (I/O) interfaces 306. The example implementation 300 also includes display circuitry 308 that generates machine interfaces 310 locally or for remote display, e.g., in a web browser running on a local or remote machine. The machine interfaces 310 and the I/O interfaces 306 may include GUIs, touch sensitive displays, voice or facial recognition inputs, buttons, switches, speakers and other user interface elements.

The communication interfaces 302 may include wireless transmitters and receivers ("transceivers") 312 and any antennas 314 used by the transmit and receive circuitry of the transceivers 312. The transceivers 312 and antennas 314 may support WiFi network communications, for instance, under any version of IEEE 802.11, e.g., 802.11n or 802.11ac. The communication interfaces 302 may also include physical transceivers 316. The physical transceivers 316 provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 304 may include hardware, software, firmware, or other circuitry in any combination. The system circuitry 304 may be implemented, for example, with one or more systems on a chip (SoC), application specific integrated circuits (ASIC), microprocessors, discrete analog and digital circuits, and other circuitry. The system circuitry 304 is part of the implementation of any desired functionality in the system 110. As just one example, the system circuitry 304 may include one or more instruction processors 318 and memories 320. The memory 320 stores, for example, control instructions 322 and an operating system 324. The processor 318 executes the control instructions 322 and the operating system 324 to carry out any desired functionality for system 110. Accordingly, the control instructions 322 may include batch and streaming analytics instructions 334, model development instructions 336, and anomaly detection, warning, and reporting instructions 338. The control parameters 326 provide and specify configuration and operating options for the control instructions 322, operating system 324, and other functionality of the system 110.

In one implementation, the system 110 implements the Elasticsearch™, Logstash™, and Kibana™ software stacks. The system 110 executes Logstash to ingest and retrieve network data 202 from multiple sources, e.g., enterprise systems that rely on the system 110 for network anomaly detection services. The ingestion process begins on the client side where, for example, an instance of Logstash executes to record and securely transmit event data, via SSL, to a Logstash instance in the ingestion circuitry 112 of the system 110 (e.g., in a staging area). The system 110 may convert the network data 202 to a specific file format, such as common event format (CEF) or comma separated values (CSV) format. The system 110 may also enhance the network data 202 with additional context by executing an operational analytics process. Once the system 110 has enhanced the network data, the system 110 sends the network data to potentially multiple destinations. Example destinations include the streaming analytics engines 114, the batch analytics engines 116, data formatting, searching, analysis and visualization processors 212, the data library 340, and cloud storage for data archival.

The system 110 may implement alerting processing logic 354, e.g., executed with the data formatting, searching, analysis and visualization processors 212. The alerting processing logic 354 may operate in real-time and execute on pre-defined alerting rules 356. Note that the system 110 may establish the alerting rules 356 by adopting rules from a pre-defined use case library, or in other manners. When a rule fires, the system 110 triggers an alert and logs the alert. The alerting rules 356 may cause data exchange between any of the components in the system 110, including the batch analytics engines 116 and the streaming analytics engines 114. For instance, the batch analytics engines 116 may receive the raw alert and return analytical results run on the alert, and any of the data and results may be present in any of the reporting GUIs generated by the visualization processors.

The GUI generation circuitry 120 may implement a wide range of visualization processors to generate any desired data visualizations for network investigation, anomaly reporting, and anomaly resolution. As one example, the GUI generation circuitry 120 implements a Kibana™ visualization processor within an Elastic™ Stack. In this respect, the GUI generation circuitry 120 composes a threat visualization interface 356 that may include a contextualization dashboard and search interface, as examples. The threat visualization interface 356 renders and presents use case metrics and other threat information on an operator system 358 via a Web UI or other machine interface. The threat visualization interface 356 is carefully designed to reduce cognitive load on the operator, and to facilitate fluid searchability, anomaly understanding, and anomaly resolution. The visualization processors may include Django™ web-framework, Angular™ structural framework, and Apache™ visualization engines, as just a few examples.

The system 110 may include database control systems and database table structures in a data library 340. Volume storage devices store the database table structures for the control instructions 322 to access, e.g., through a database control system, to perform the functionality implemented in the control instructions 322.

In the example shown in FIG. 3, the data library 340 stores any number of baseline models 342 that provide the evolving definitions of nominal network behavior. The data library 340 stores the network data 202 in an event database 344. To support the NLP processing, the data library 340 maintains a corpus of network characterizing documents in a corpus database 352. From the corpus, the NLP processing identifies words of interest (stored, e.g., in the words database 348) and topics (stored, e.g., in the topics database 350). The words and topics may appear in any of the documents received as part of the network data 202, with documents defined by and stored in the documents database 346. One example of a network characterizing document is a collection of network events defined by selected network identifiers. For, example, the document may be a collection of network events identified by a source IP address and a destination IP address. These addresses characterize the events present in the network data 202, e.g., received as Netflow, jflow, s-flow, Netstream, Cflow, or Rflow records and datagrams.

The data library 340, control instructions 322, control parameters 326, and machine interface generation circuitry 308 improve the functioning of the underlying computer hardware itself. That is, these features (among others described here) are specific improvements in way that the underlying computer system operates. The improvements facilitate more efficient, accurate, consistent, and precise execution of network analysis and anomaly detection, across a wide range of enterprise networks according to dynamically adapting nominal models for the networks.

Figure 4:
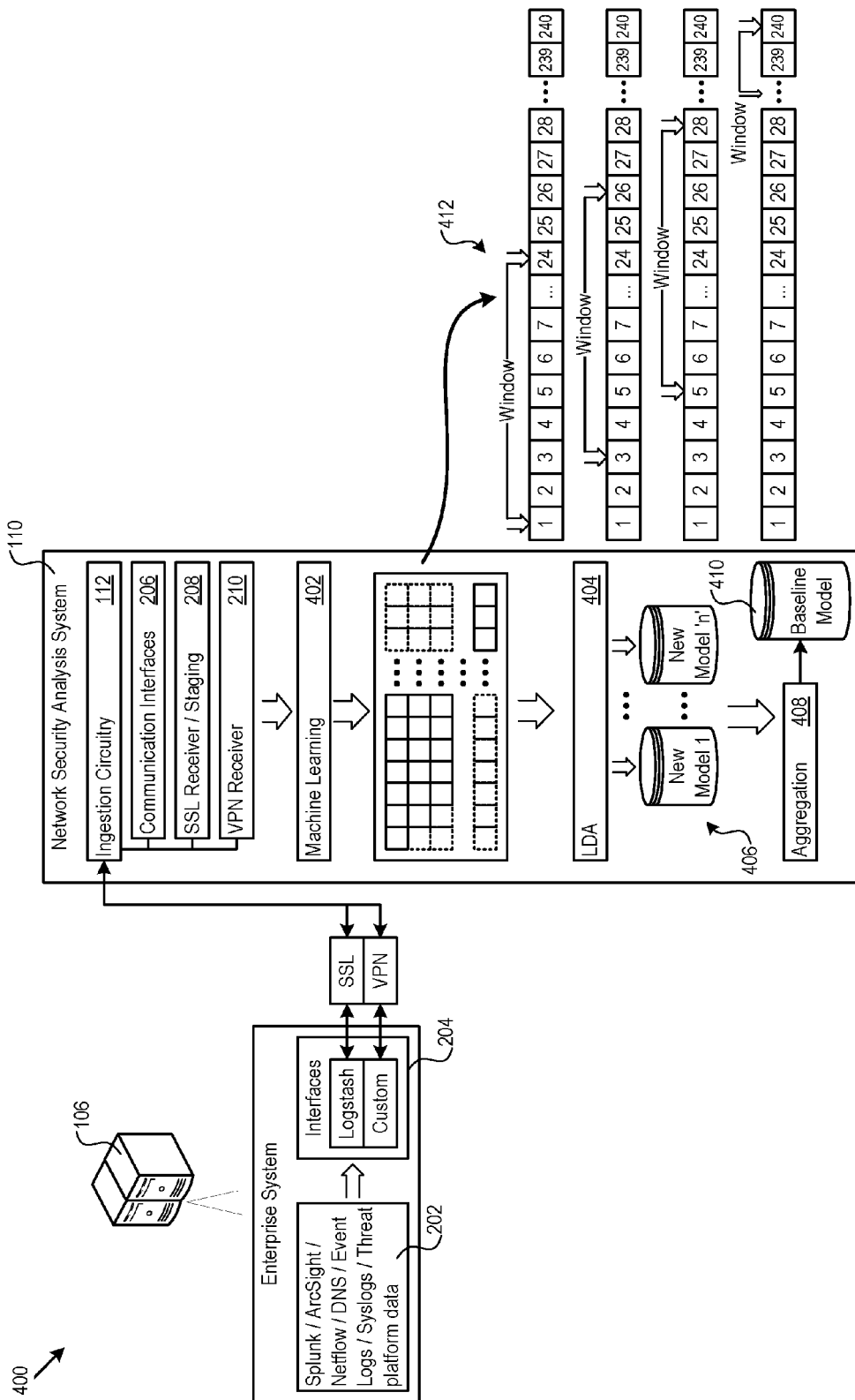
FIG. 4 shows example of sliding window machine learning that the system may implement.

With regard to the baseline models 118, FIG. 4 shows example of sliding window machine learning that the system 110 may implement. As noted previously, the ingestion circuitry 112 receives the network data 202 from the enterprise systems 102-106. The system 110 adapts to the dynamic nature of the corpus characterizing nominal network operation. One tremendous technical difficulty with anomaly detection is the following: what behavior is nominal network behavior is often evolving and changing. The patterns of network sessions and network activity that define normal behavior extend over certain, sometimes lengthy, variable periods of time. In response to these technical challenges, the system 110 develops a dynamically adapting definition of the nominal behavior represented in the baseline models 118 to provide a more accurate and up-to-date baseline of "normal" against which the system 110 may more accurately identify anomalies.

As shown in FIG. 4, the system 110 solves this technical problem by executing a machine learning processor 402 that analyzes an overlapping, moving window 412 of network activity as part of the analysis framework leading to the baseline models 118. Changes in the normal network activity over time are reflected in the changes in the LDA topic distributions of the vocabulary. These changes are reflected in scores that measure how well each document in the model fits the model of that period. Score represent a time series that can be broken down into cyclostationary periods (e.g., multiple interleaved snapshots). When the time-series does not have well-defined frequency properties, the system 110 may execute an autocorrelation function to estimate the period by posing the candidate period as the lag of the function. The system 110 dynamically adjusts the period of interest and overlap and the baseline documents identified and used to identify outliers. These outliers reflect content anomalies. The processing reduces the dimensionality of the problem space and this reduced-dimensionality perspective is one of several that the system 110 renders in the GUIs provided to the operators.

For the purposes of illustration, the windows in FIG. 4 are 24 hours wide, the window offset is two hours for each iteration, and there are 22 hours of overlap between window (n) and window (n+1). In this example, the system 110 produces a new baseline model 410 of network behavior every two hours. Each model produces a set of document scores, e.g., an overall score, that reflect the goodness of fit of the document to that model. As noted above, the document may be a set of network data records characterized by IP source and destination address, e.g., NetFlow records.

Stability may be defined by a moving, overlapping window on scores. For instance, the system 110 may create a vector from the scores from models (m) to (n), e.g., 1 to 10, and creates a second vector from the scores from models (m+1) to (n+1), e.g., 2 to 11, then from 3 to 11, and so on. The system 110 compares these vectors using selected analysis techniques, such as cosine similarity. As such, changes in document scores over time (e.g., model (m) to model (m+1) indicate the stability of the document with respect to the dynamic corpus. The system 110 uses the scores, e.g., the stability measures, in defining a content-based perspective of the normal network state. For example, a high score with little change may indicate nominal operation, while large variation in stability with low fit to the model may indicate a potential anomaly.

Note that the control parameters 326 may define the window size and offset, the number of windows, and the number of hours or days over which the LDA processor 404 generates models prior to aggregation. The window size and offset, the number of windows, number of hours/days, and other analysis parameters may differ greatly for any given network for any given enterprise, and suitable parameters may be determined empirically. The LDA processor 404 generates a windowed network model 406 responsive to each window of network data. For a 10 day period of 240 hours, for instance, the 2-hour sliding window will result in 108 unique windowed network models 406. The aggregation processor 408, responsive to the stability and document scores, combines the multiple windowed network models 406 together to form a new baseline model 410 which will represent the ongoing definition of what is nominal network activity for any given network.

A specific example of the aggregation follows. Continuing with the 10 day period noted above, and 2 hour sliding windows, there will be 108 scores for every IP address. A new set of scores is generated every two hours when the moving window 412 slides. The aggregation processor 408 combines the windowed network models 406, e.g., in the following manner: distributions of individual IP scores and stability measurements are defined over the period of interest. The cumulative distribution function (CDF) is then used to identify those IPs that demonstrate a high degree of fit as well as stability.

The LDA processor 404 performs its processing with respect to defined vocabulary components, including the document definition which controls what constitutes a document. For example, for NetFlow data, the LDA processor 404 may select source and destination IP addresses as identifiers. As noted above, a document then becomes a collection of events defined by the selected identifier(s). The control parameters 326 may define the number of unique network events that make up a document, with an event having a pre-defined meaning, such as a connection made or attempted between the source and destination IP addresses.

The LDA processor 404 also establishes word definitions. For the application of LDA to network analysis, the LDA processor 404 defines meaningful words. Again using NetFlow data as an example, the LDA processor 404 may choose ports, packet size, number of packets, and number of bytes as words. Other examples of words that may be used include connection start time and connection duration. In one specific implementation the word values are: ports, connection start time, number of packets, and number of bytes.

The system 110 also analyzes pre-defined topics present within the network data. What words constitute a topic may be decided ahead of time based upon, e.g., initial analysis of network data, and the number of topics may be constrained to a selected set, e.g., of 20 topics. Accordingly, in one implementation, the system uses a fixed number of topics. In LDA, topics are not predefined. Instead, topics are assigned via LDA and the distribution is assumed to have a Dirichlet parameterization. Topics are not strongly defined but can be classified. For example, after an LDA run, the most likely words in a topic might indicate the topic could be classified as some form of botnet activity. More particularly, the system 110 considers the distribution of topics across words (WT) and across documents (DT) to define the LDA model at any point in time. WT is a function of word value definition and word frequency, and word frequency itself is a function of word value definition, document value definition and document frequency. Document frequency is a function of how defined events are collected, the document value definition. WT can expressed as a function of word and document value definitions. The same logic applied to DT yields the same results. These functional dependencies demonstrate the importance of the vocabulary in accurately measuring differences between the documents which define the baseline model 410 at any given point in time.

For any given document value definition there is a definite probability that documents with different definition values will have the same level of activity. In the example above, both the source and destination IP address were included in the document value definition. The words, and therefore their value definition, distinguish between these documents. The relative size of the word value vocabulary may vary widely, as the values themselves describe a corpus that is meaningful in terms of security analysis. In that respect, the system 110 is able to ascertain, as just one example, what destination port in combination with a certain number of packets and bytes is common in a "normal" connection, and what combinations are anomalies.

With regard to the example word values noted above, connection start time, number of packets and number of bytes are numeric and can take on a wide range of values. Minor differences in these values tend to have little if any impact on the stated role of the word value definition, that is to distinguish between documents with the same activity. As part of its analysis, the system 110 may then bin these values, with bin parameters based on actual distributions of empirical data. The bin analysis allows the system 110 to detect outliers which point to documents that least fit the model. The system 110 may adjust the bin dimensions to provide any desired level of distinction between documents. Port values are also numeric, and the analysis captures (e.g., based on empirical review) expected and unexpected source and destination port combinations.

Numerical binning is one step the system 110 takes to give each word a unique meaning. The meaning is given in terms of the corpus, and therefore the distribution of the unique values of the numeric in question drive the binning. The number of bins may be fixed to control the size of the vocabulary. If overrun of a bin occurs, the system 110 redistributes the remaining values into the remaining bins.

The LDA processor 404 is implemented as an NLP tool. The LDA processor 404 may operate on documents in the corpus that are similar in size, e.g., word count. The LDA processor 404 describes the concepts contained in the corpus in terms of topic distributions across words and documents. Concepts may represent words with meaning, and therefore words with little or no meaning such as articles and stop words may be excluded without compromising model validity.

One source of documents, as noted above, is Netflow metadata. The Netflow metadata is a form of abstraction of overall network behavior, and all created words in the vocabulary have meaning. Further, document size can and does vary significantly, e.g., from 1 word to several million words, over any collection period. The scoring logic in the LDA processor 404 takes into account the variation in document size and its impact on identifying IP addresses that least fit the created topic model. While low scores typically indicate low word counts, there will be instances where relatively low scores result from relatively high word counts.

LDA is a NLP tool designed to look at a corpus of docs, which it expects to be about the same in terms of number of words. However, part of the technical solutions in the system 110 include handling documents with a wide range of word sizes, e.g., from one word to millions of words, rather than ignoring documents of different sizes that help define what is normal network traffic. In that respect, the system 110 considers documents of different sizes, but applies a compensation factor or weighting factor to the raw document score to account for the size variation.

Figure 16:
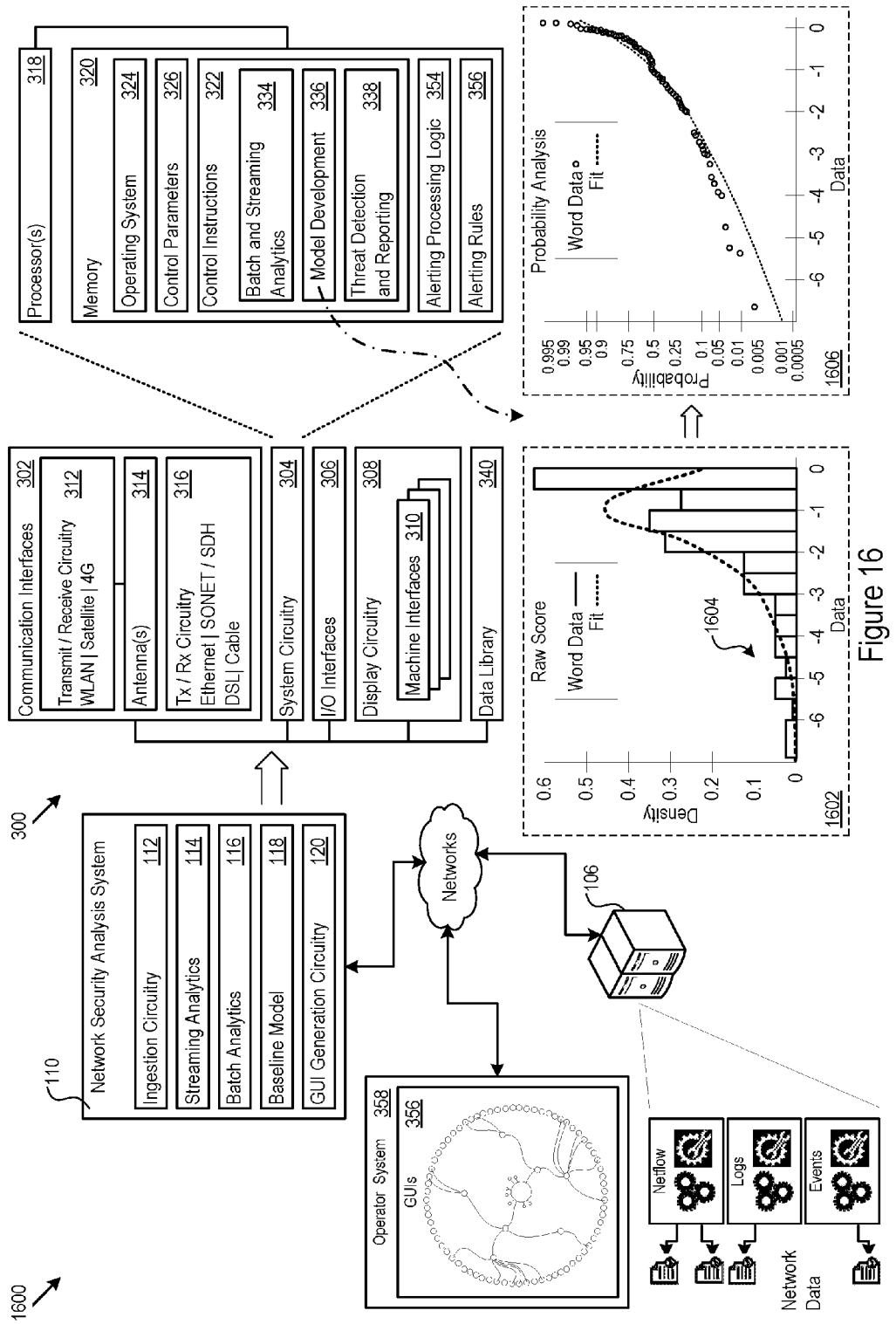
FIG. 16 shows an example of how the system accounts for differences in score using weighting factors.

Turning ahead to FIG. 16, that figure shows a compensation example 1600 of how the system 110 accounts for documents of different sizes. In this example, the sample is a group of documents with the same particular word count, and similar analysis are performed for documents with other word counts to weight scores across documents of different sizes. The model development logic 336 has performed an analysis that generates the histogram 1602 (in solid lines) of the raw scores on a log normal scale. The system 110 detects the presence of the extended tail 1604, a region where documents with the same word count have very low scores, e.g., below a pre-determined score threshold.

The analysis also includes a corresponding probability analysis 1606. For instance (in this example), there is approximately a 0.005 probability that a score will be below those contained in bin 6. The system 110 uses the probabilities determined in the probability analysis 1606 to weight the raw scores. The lower the probability, the greater the weighting factor the system 110 applies to the raw score to generate the final score. The weighting effectively drives the final score lower, into the range of a more likely anomaly.

The system 110 may implement a second natural language processing technique such as principal component analysis (PCA), e.g., in the pipeline of the batch analytics engines 116. The pipeline ingests data in CEF, for instance. The system 110 executes PCA to reduce the dimensionality of the CEF formatted data, thereby reducing an extensive amount of information, extracting the most useful data components, and reducing cognitive load to facilitate analysis. In one implementation, each of the dimensions corresponds to a field, mapping to a name, in the CEF formatted data. For example, source IP may define a name where each event ID is a dimension corresponding with the source IP's additional information. When, for instance, there are three event IDs for a given source IP, the source IP will be a data point in a three-dimensional space. The common trends are determined by taking the top 'K' principal components, e.g., the top two, and using those components as the new coordinate axes. The system 110 may then plot these data points on these axes. Once every point is plotted, the plot may reveal clusters and emphasize outliers. The system 110 may identify outliers as anomalous source IP addresses, and send the source IP addresses to other system components for further analysis and enhancement, such as the data formatting, searching, analysis and visualization processors 212.

FIGS. 5-15 show examples of alerting and analysis graphical user interfaces 500-1500. In any given network, there may be an extremely large set of devices, an immense amount of data traffic occurring on the network, and evolving traffic patterns over time. The GUIs described below solve technical problems with prior GUIs by implementing structure and function including rendering views of devices and threats that directly facilitate better understanding of network topology, that show the devices communicating over the network, and indicate whether the communications are potentially anomalous. In particular, the GUIs described below provide enhanced speed, accuracy, and usability in identifying potential threats in relation to the network devices, classifying the potential threats, and making decisions about what measures to take, if any, responsive to the potential threat.

The system 110 is not limited to one specific way to render the GUIs. In that regard, FIGS. 5-9 show one approach at rendering the GUIs, while FIGS. 10-15 show a second approach. In the second approach, as will be described in more detail below, the GUIs include a network focused multiple ring view.

The system 110 provides a comprehensive view of overall enterprise network activity. The interfaces that the system 110 renders not only highlight network activity, but also the enterprise processes associated with the network activity. The interfaces provide a common platform for visually integrating alerts generated by the multiple sensors and anomaly detection mechanisms incorporated into the system 110. The system network flow, log, and endpoint analytics provide a layered defense capability that detects and correlates malicious activity to produce holistic representations of threat behaviors. The interfaces allow these correlated events to be understood in the context of enterprise business processes and network structure. This, in turn, provides a basis for rapidly assessing the nature of emerging threats and quickly developing remediation strategies that minimize impact on ongoing enterprise operations.

Expressed another way, the network security analysis system 100 performs anomaly detection with low false positives by implementing a multiple perspective analysis of network data. The analysis system takes a new approach to defining the network baseline, using, as examples, topic modeling and time series algorithms. The system 110 implements natural language processing techniques to examine the content of network and time series data to establish and maintain a definition of the baseline network state model, against which new activity is compared to identify anomalies.

Figure 5:
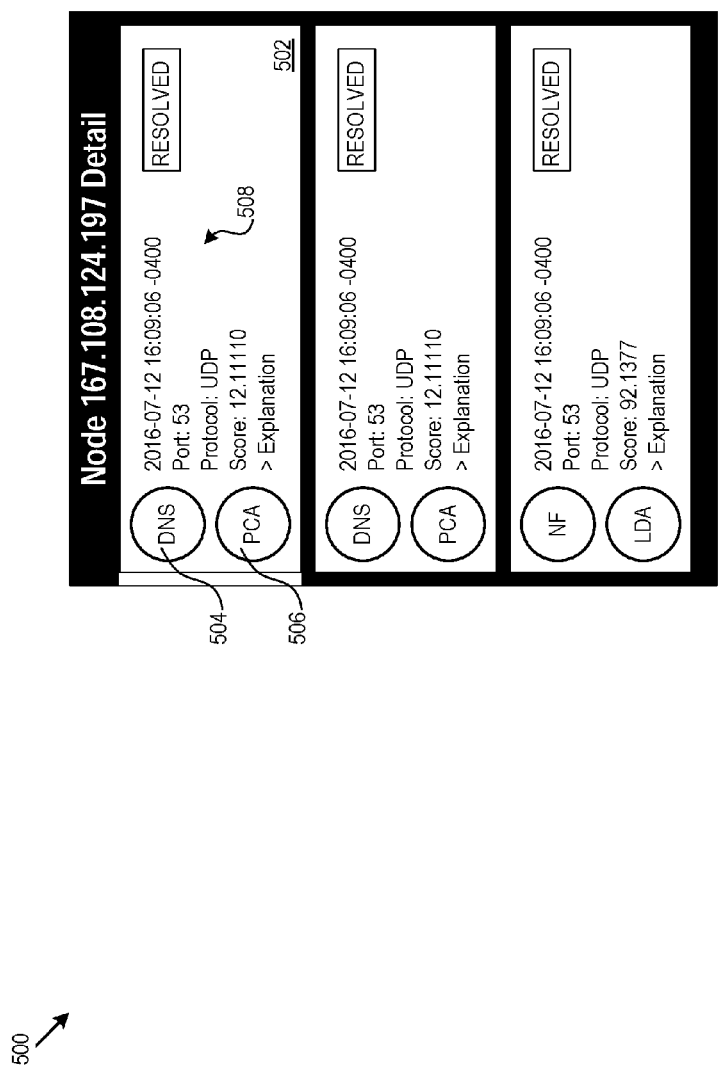

In FIG. 5, the example interface 500 presents alerts for a node given by the IP address 167.108.124.197. The alert 502 is representative. In the alert 502, a data flow indicator 504 specifies the network data source giving rise to the alert, such as DNS data, Netflow data, system log data, or other network data. A processing engine identifier 506 indicates which analysis engine identified the anomaly, e.g., the PCA processing engine, the LDA engine, or NLP engine. The details pane 508 reports specific details concerning the anomaly, including date and time, port number, communication protocol, and severity score.

Figure 6:
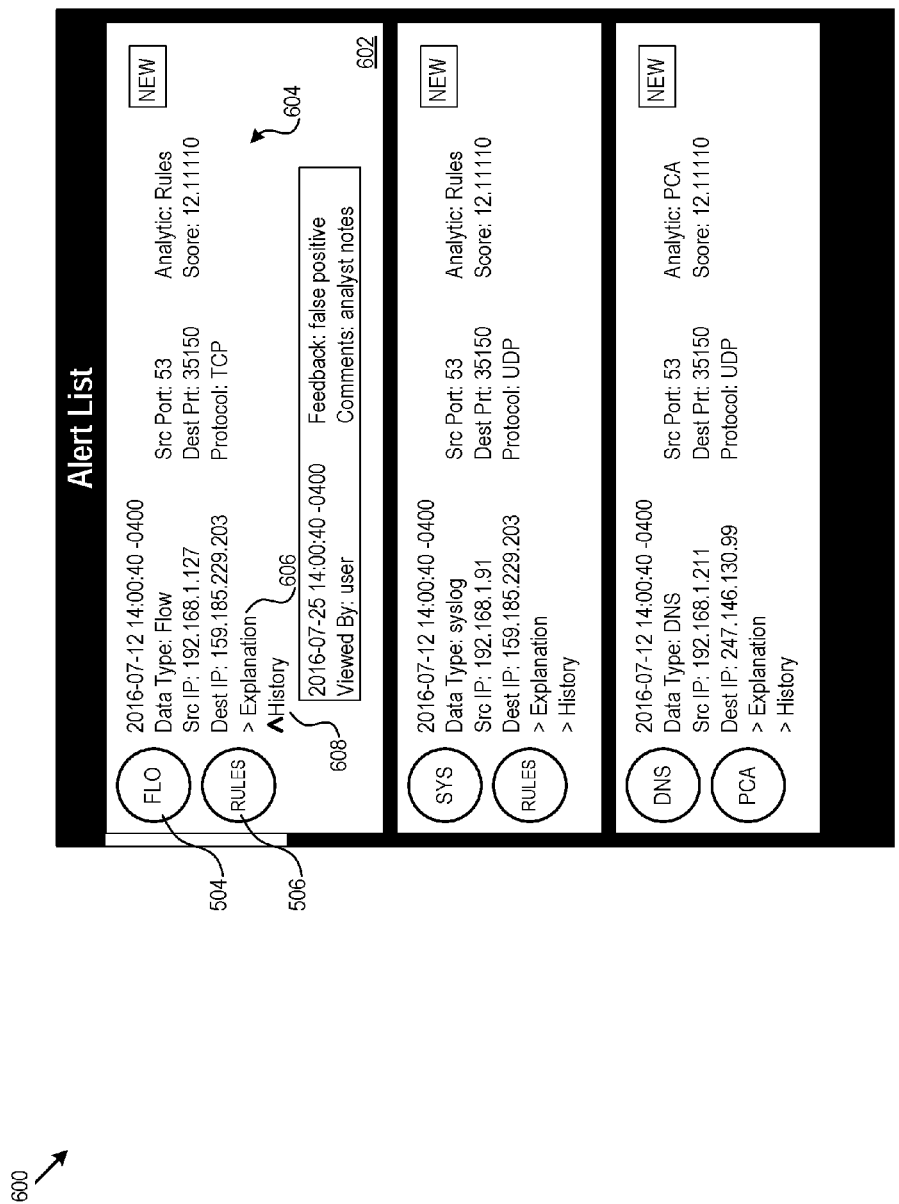

FIG. 6 shows an example interface 600 for an alert list, which may aggregate alerts (e.g., the alert 602) over multiple IPs for later review and consideration. The alerts provide additional information in the detail pane 604, e.g., with respect to the examples given in FIG. 5. The alert 602 includes, for example, the destination IP address, destination port, and the network data type (e.g., Netflow or DNS data). The alert 602 also includes an explanation element 606 and a history element 608, either of which may be expanded and collapsed to show or hide additional details concerning the alert.

Figure 7:
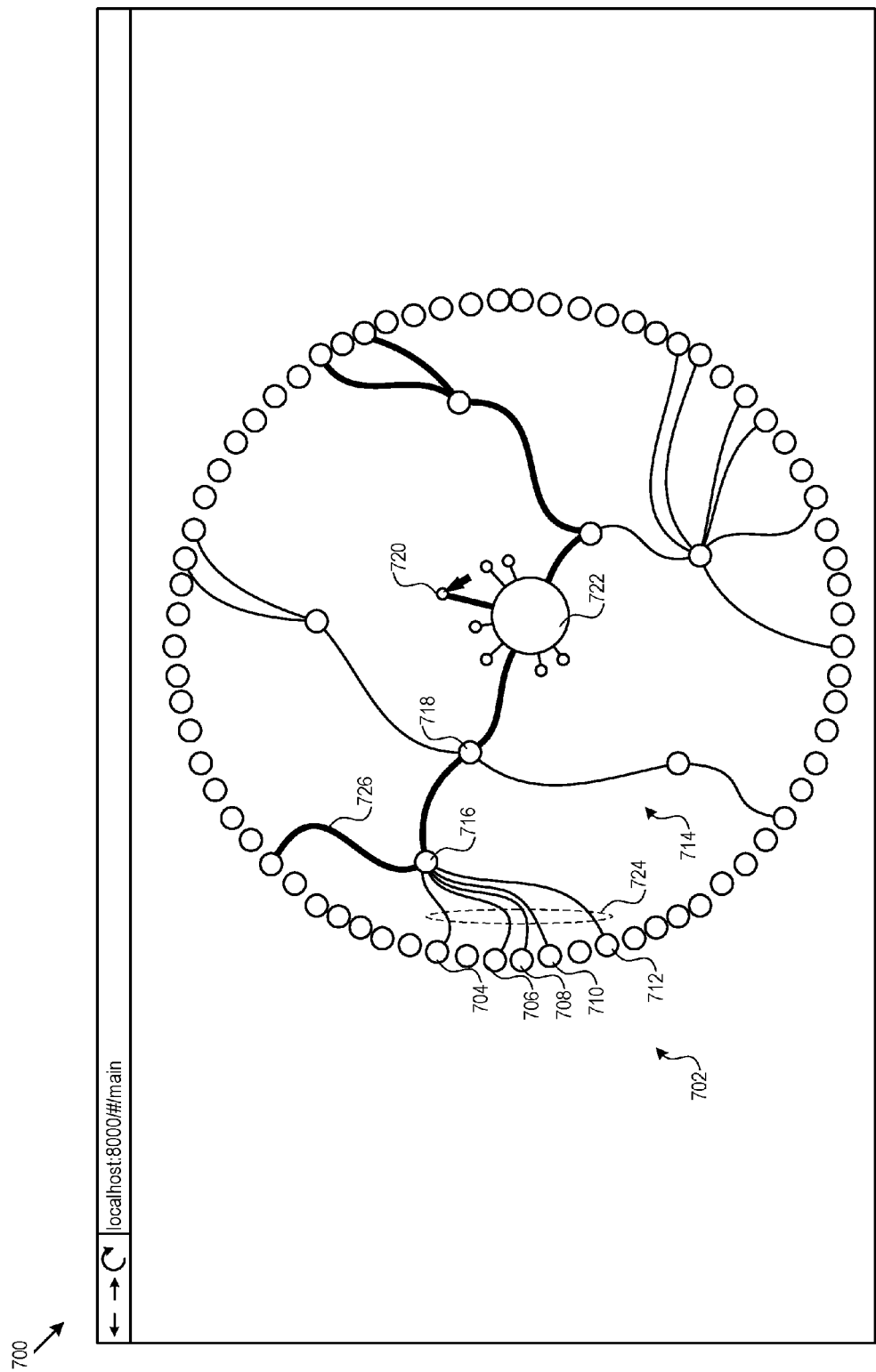
Figure 8:
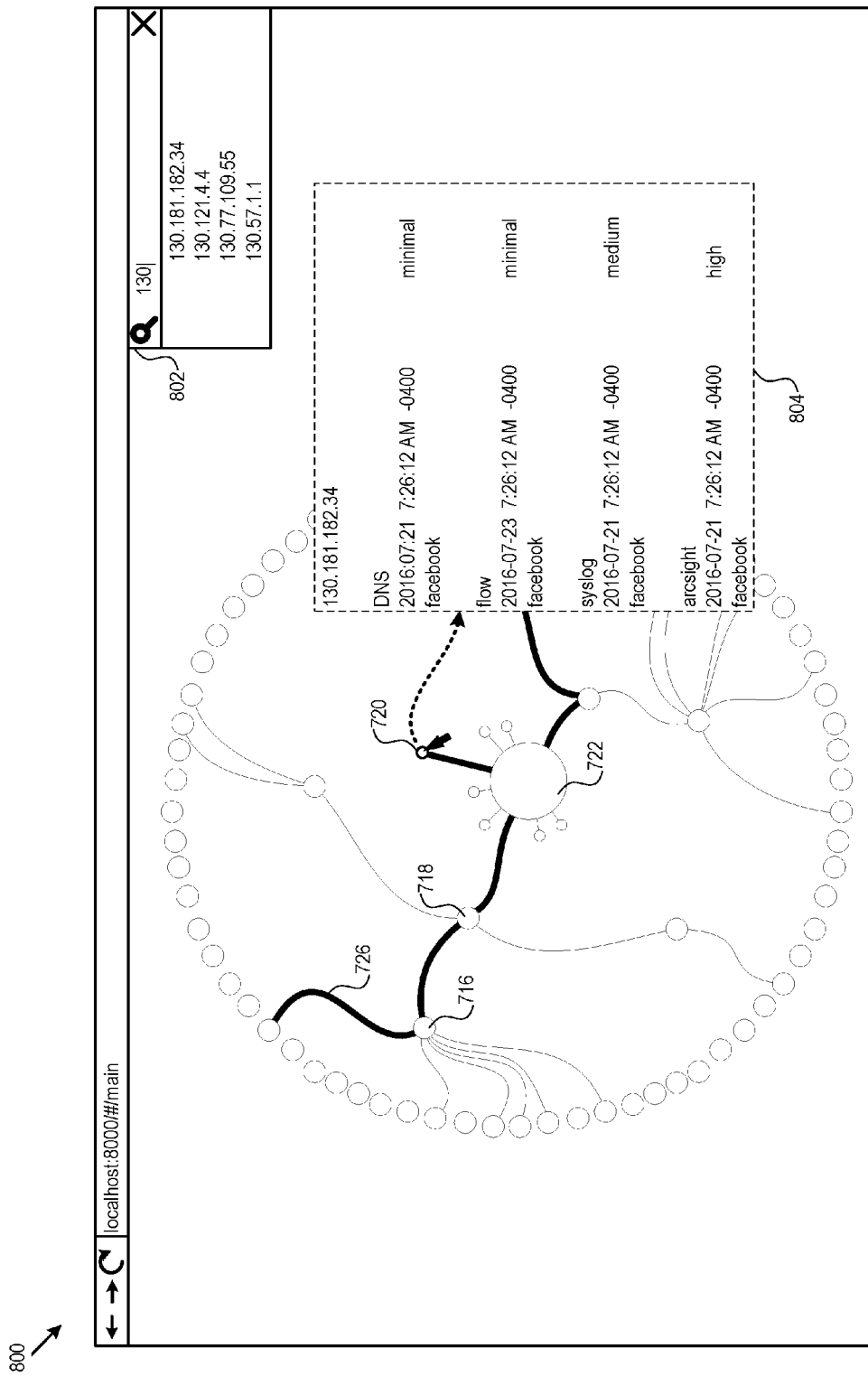
Figure 9:
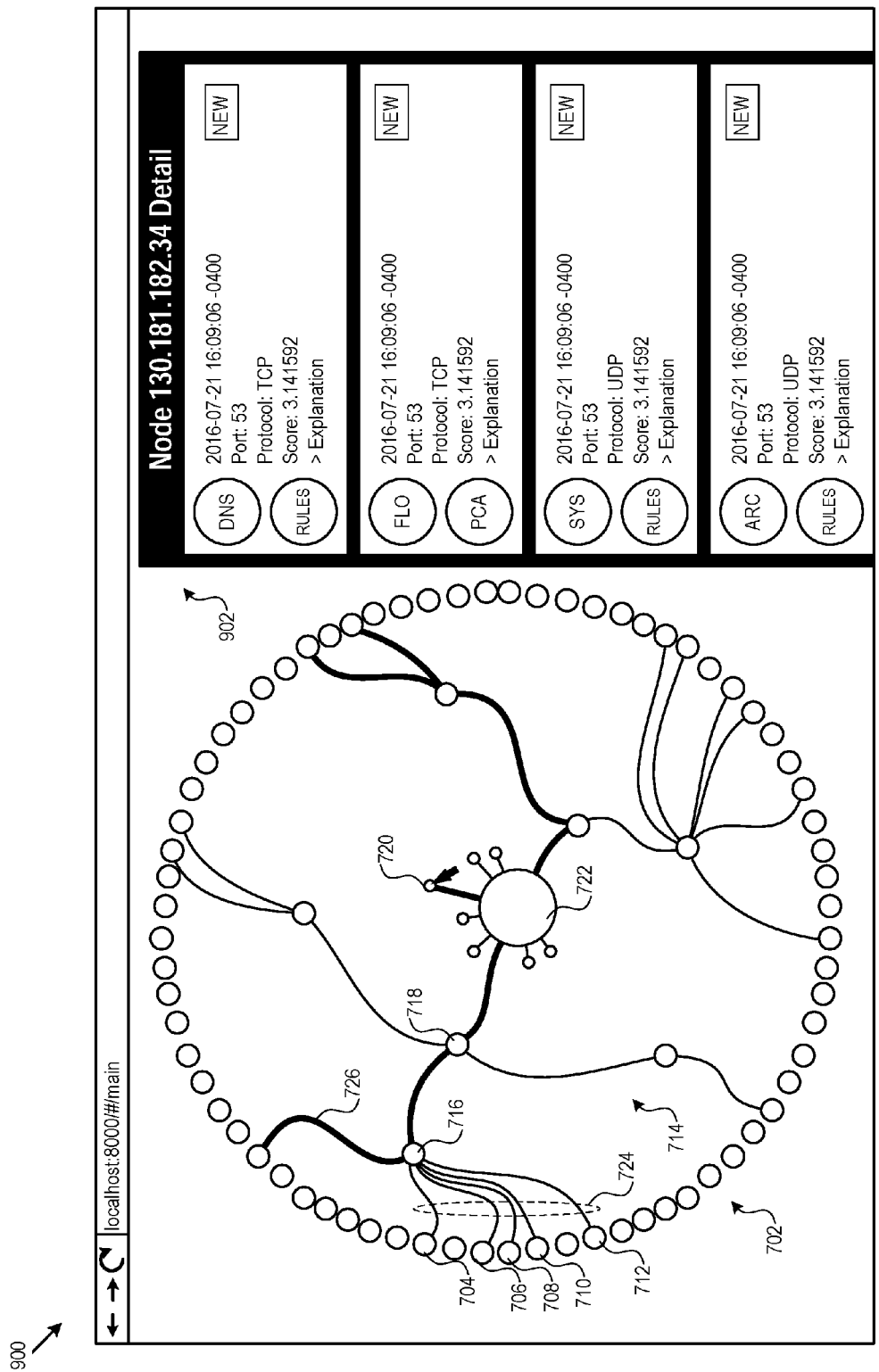

FIGS. 7-9 show a network view interfaces 700-900. The GUI generation circuitry 120 may create the network view interfaces 700-900 responsive, for example, to the IP addresses found within a pre-defined time window (e.g., the last 24 hours) within the network data 202. In FIG. 7, for instance, the interface 700 includes an external section 702 which displays GUI node elements for IPs outside the enterprise network. In FIG. 7, the interface 700 arranges these IPs into a ring arrangement of circular GUI node elements, including as a few examples, the nodes 704, 706, 708, 710, and 712. These external nodes may represent any device or endpoint that is not part of or controlled within the enterprise network under analysis.

The interface 700 includes an internal section 714 as well. The internal section 714 displays GUI node elements for IPs inside the enterprise network. In FIG. 7, the interface 700 distributes these IPs in the interior space defined by the ring shape, including, as a few examples, the nodes 716, 718, and 720. The interface 700 geometrically groups related internal nodes on a ring 722. The related nodes may be a collection of database or email servers, for instance, or a group of network printers or other resources meeting any pre-defined relationship criteria.

The interface 700 includes connectivity paths between nodes. The connectivity paths visualize how nodes have communicated together in the past. For instance the connectivity paths 724 show that there have been prior communication events between the external nodes 704-712, and the internal node 716. The operator may interact with the interface 700 to zoom, rotate in three dimensions, and scroll horizontally and vertically to focus on any given area of the interface 700. The operator may select a node for review, or the interface 700 may automatically highlight nodes implicated in an anomalous event. In FIG. 7, the interface 700 has highlighted a particular path, including path segment 726, through the network in connection with the review of the internal node 720.

FIG. 8 shows a filter interface 802. The filter interface 802 filters the nodes on any available data, such as IP address, port, service, and the like to help the operator find a specific port or IP address of interest. The GUI generation circuitry 120 responsively updates the interfaces to show IPs and related paths and alerts that pass or match the filter, e.g., an alert list 804 for IP 130.181.182.34, along with the pathway through the network implicated by the node or alert selected for review. In FIG. 8, the operator has selected node 720 for review, and the interface 800 responds with the alert list 804 as well as additional details about the node.

As shown in FIG. 9, the interface 900 may respond with more detailed alert information 902, including data type, analysis type, anomaly score, explanation, history, and other information. The GUI generation circuitry 120 may additionally create a full-screen list of alerts for review.

Figure 10:
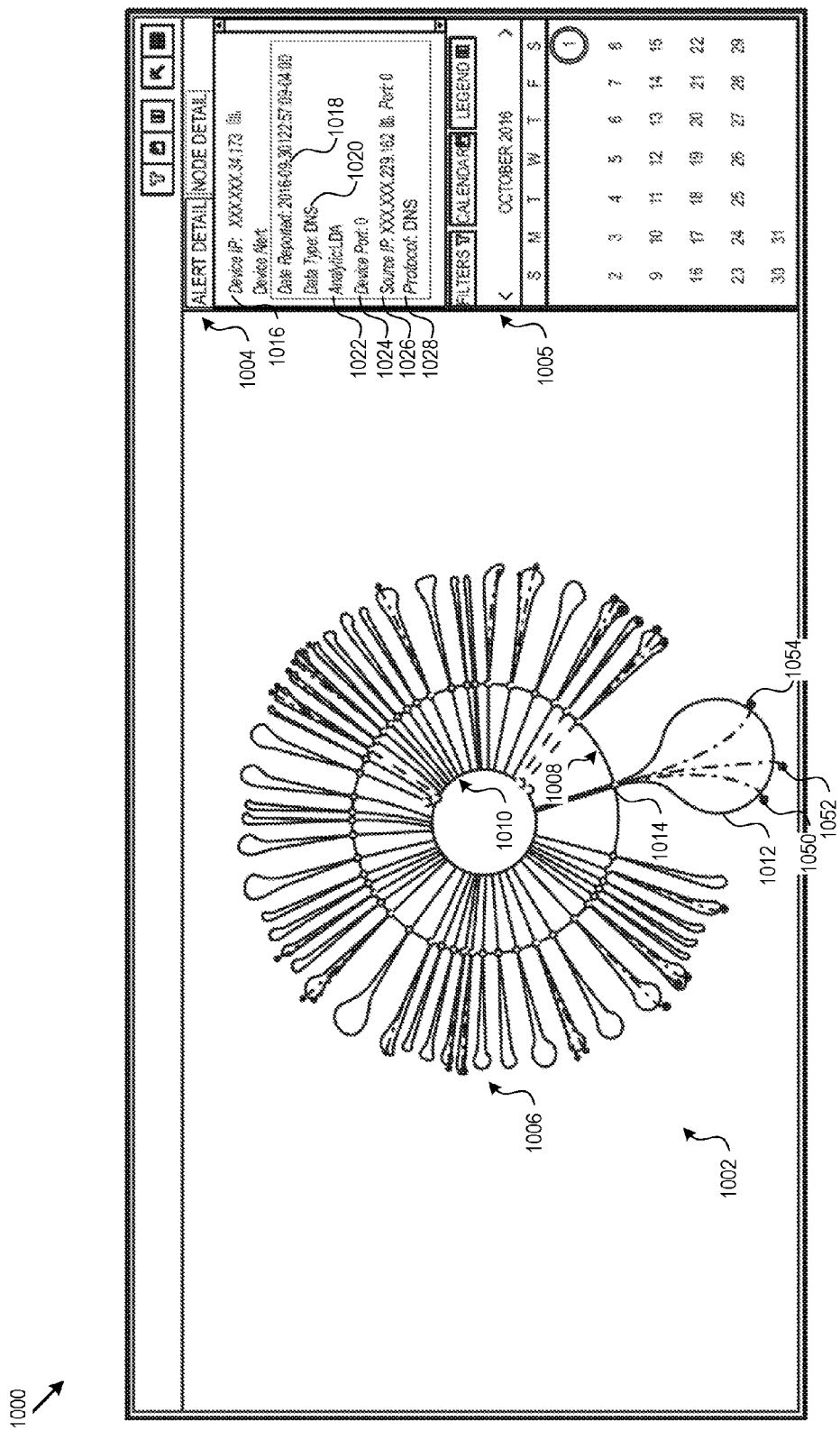

FIGS. 10-15 show a different approach at visualization. FIG. 10 shows a visualization 1000 including a network graph 1002 that represents the enterprise network. An alert detail panel 1004 includes network node detail, e.g., for nodes in an alert status. A filter panel 1005 presents multiple filtering options, e.g., by calendar date, severity score, IP address, or alert type. The system 110 may generate the network graph 1002 at pre-determined times or intervals responsive to records of network data 202 from the prior time interval, e.g., once per day, upon demand, when a new anomaly is detected, or at other times. The system 110 overlays alerts on the network graph 1002 to help the operator pinpoint potential network anomalies.

In the example of FIG. 10, the network graph 1002 does not display the network physical topology, nor does proximity of graphical components on the network graph 1002 represent physical connectedness or location. Rather, the network graph 1002 shows a security oriented view by displaying nodes connected to routers, and pathways from internal nodes to external nodes. In more detail, the network graph 1002 in FIG. 10 displays an outermost ring 1006 of internal nodes, a middle ring 1008 of internal routers, an innermost ring 1010 of external nodes.

The internal nodes are those endpoints, e.g., desktops, laptops, smartphones, servers, and other devices, that are in the private IP space of the enterprise. That is, the internal nodes are those endpoints internally owned and controlled by the enterprise, endpoints that the enterprise considers to be inside of its network. The internal routers arranged on the middle ring 1008 are network devices also under control of the enterprise. The external nodes are those endpoints outside of the enterprise network. External nodes include, as just a few examples, Internet connected computers, smartphones, and servers.

In one implementation, the endpoints arranged on the outermost ring 1006 in groups of endpoints that are connected to the same router. In this manner, the network graph 1002 portrays a subnet view with respect to each endpoint in the outermost ring 1006, where endpoints are gathered into endpoint groups. There may be any number of endpoints in an endpoint group, and membership in an endpoint group may be determined by any pre-determined network characteristic, e.g., connection of the endpoint to a common enterprise router. FIG. 10 shows an example in which the endpoint group 1012 includes a large number of endpoints (including the endpoints 1050, 1052 and 1054) connected to the internal router 1014. In this example, the endpoint clusters are teardrop-shaped to help emphasize the number of endpoints in the endpoint group.

Figure 11:
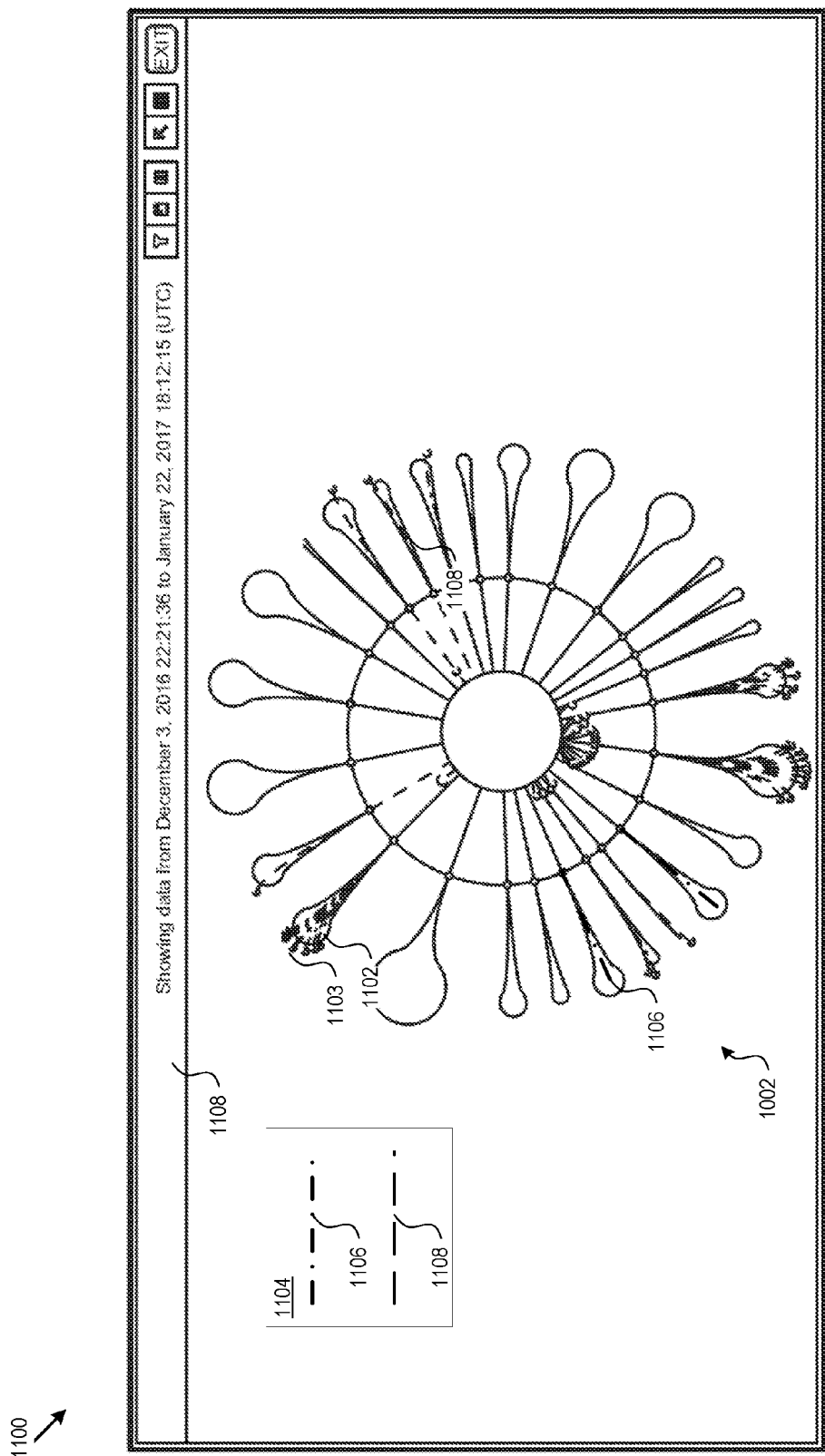

FIG. 11 shows a visualization 1100 of the network graph 1002 in which a variable zoom is applied to show the detail in the endpoint group 1102. In particular, the variable zoom supported by the system 110 reveals that the endpoint groups include individual connectivity lines, where the endpoint (e.g., the endpoint 1103) of each connectivity line represents a particular device. The legend 1104 in FIG. 11 also distinguishes between different types of lines in the visualization 1100. The distinguishing characteristics for any line type is pre-configurable to include any color, shape, thickness, pattern, animation, or other features. The line style 1106 is a raised line showing an internal-to-internal connection involving an individual endpoint within the subnet that is in alert status, and that the system 110 suggests for review for whether anomalous activity is actually present. The line style 1106 thereby indicates that the system 110 has generated an alert from the network data involving the IP address of the device. The internal-to-internal line style helps to identify anomalous traffic moving inside the network, e.g., a virus spreading among enterprise endpoints.

The line style 1108 indicates an internal-to-external connection involving an individual endpoint within a subnet that is in alert status. Because the alert involves an external connection, the GUI uses the line style 1108 to direct attention to a potentially more serious alert. The internal-to-external line style helps to identify anomalous traffic from outside the network, e.g., an external attack on the internal network.

Selecting an endpoint causes the system 110 to generate the alert detail panel 1004 adjacent the network graph 1002. The alert panel 1004 includes specific information about the alerted node. In the example in FIG. 10, the alert panel 1004 includes the following detail fields: device IP address 1016, alert date 1018, network data type 1020 giving rise to the alert (e.g., DNS or Netflow data), alert analysis type 1022, device port number 1024, source IP address and port 1026, and the communication protocol 1028.

Figure 12:
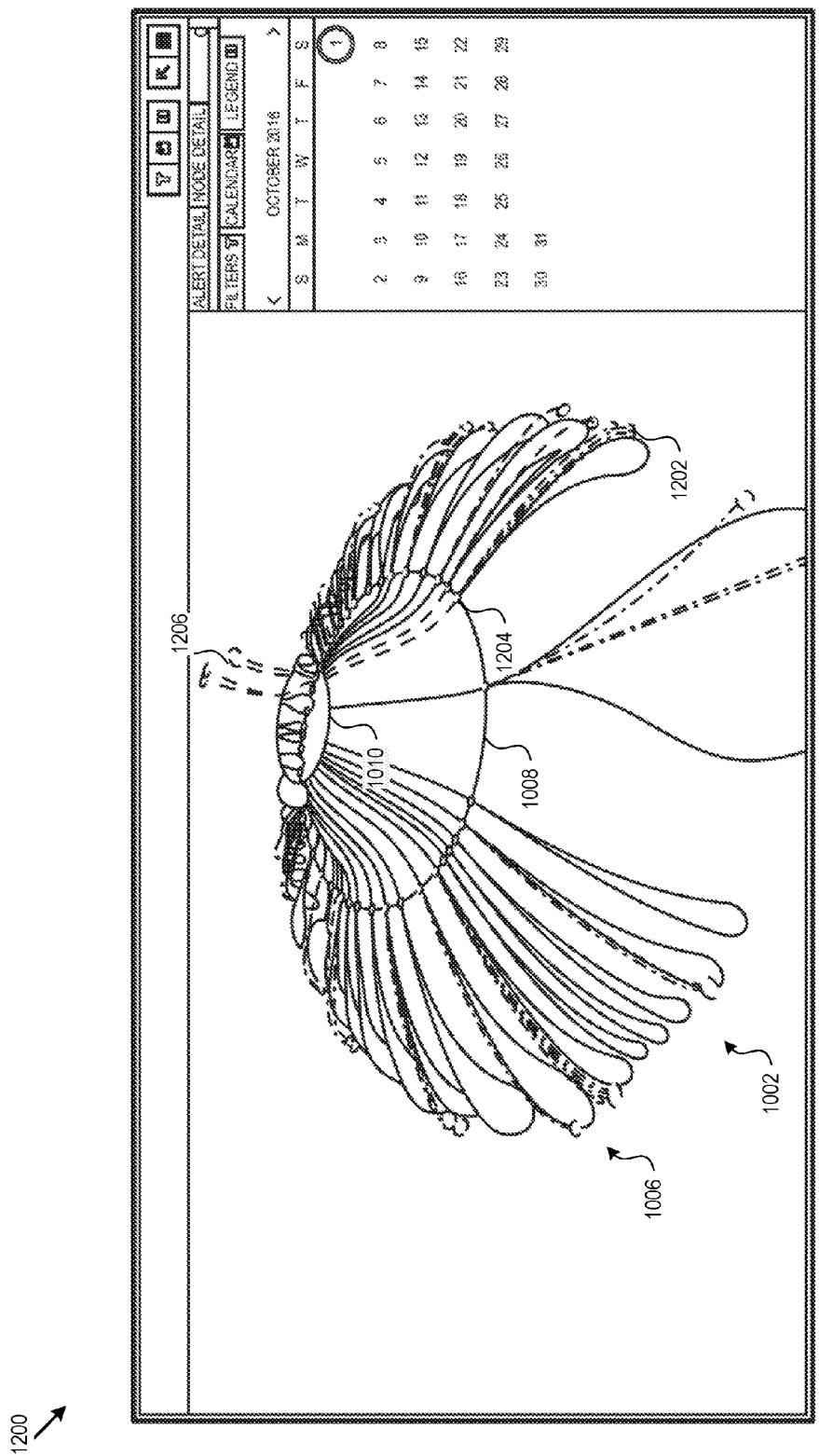
Figure 13:
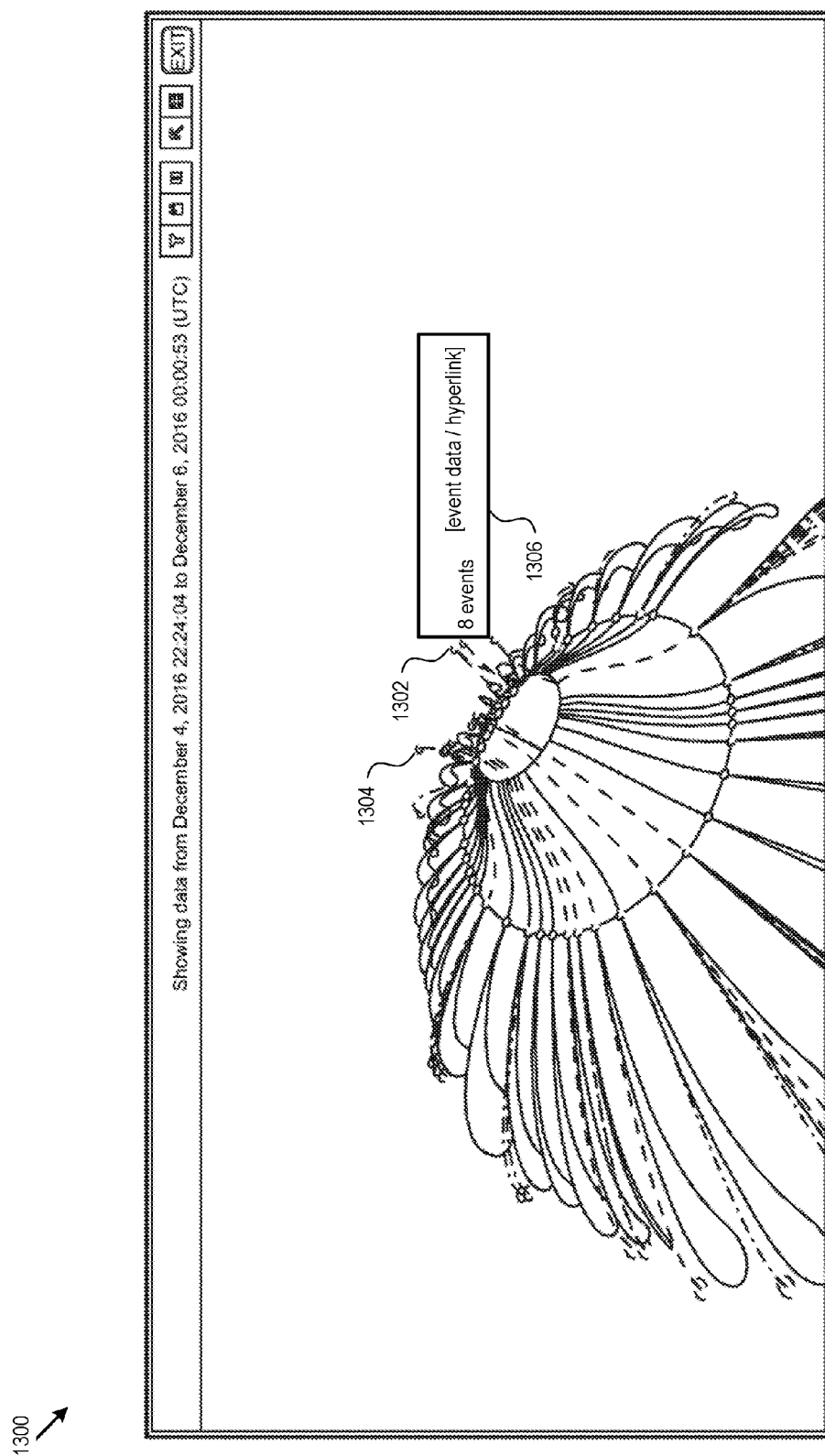
Figure 14:
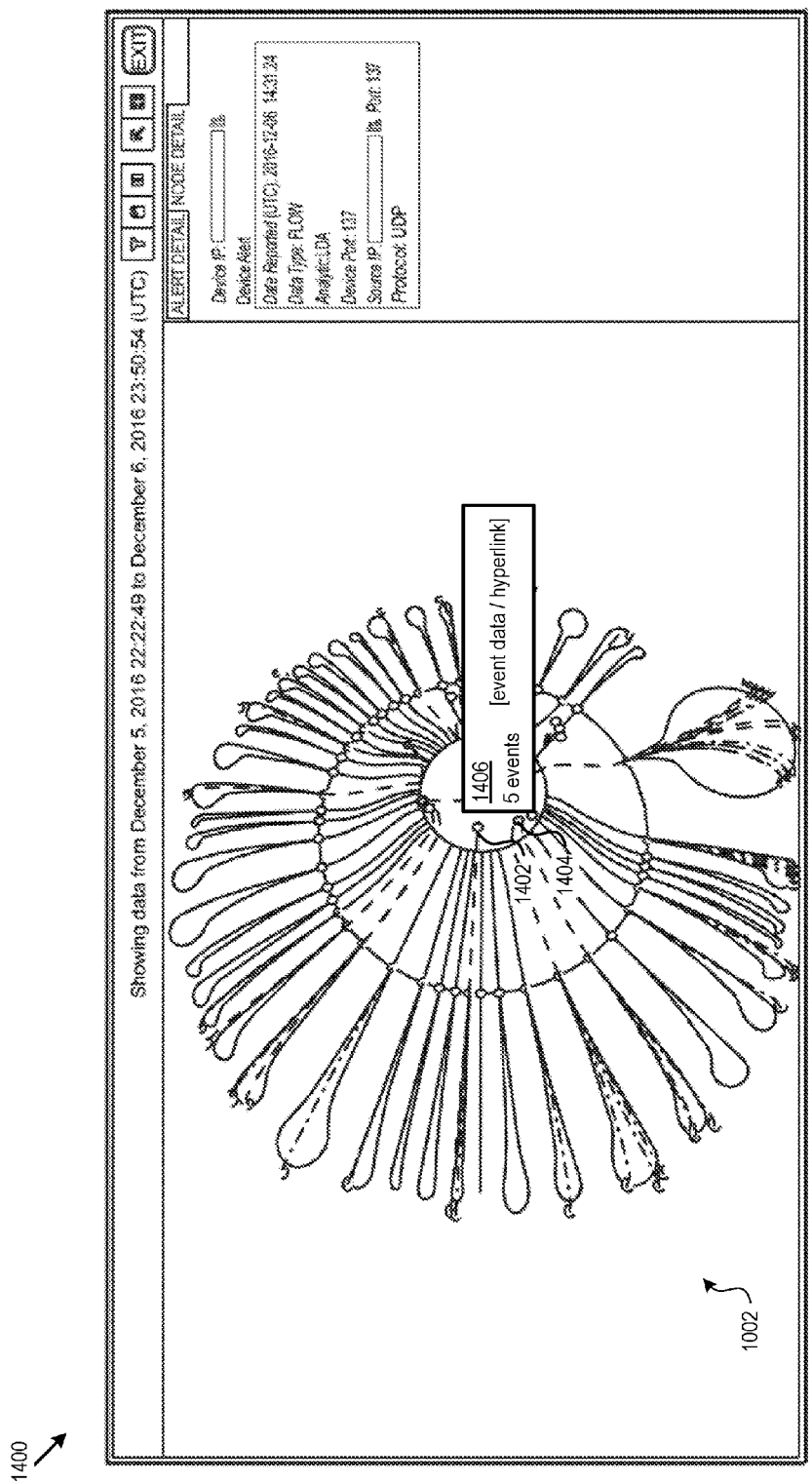

FIGS. 12-14 highlight another feature of the system control over the GUIs. In particular, FIG. 12 shows that the system 110 accepts and responds to roll, pitch, and yaw rotation inputs on the GUI. FIG. 12 provides one particular example of rotation 1200 of the network graph 1002. FIG. 12 highlights that the system 110 generates the network graph 1002 as a three-dimensional entity. The three-dimensional nature helps to accurately depict the connectivity and data flow between endpoints, including from the internal nodes on the outermost ring 1006 to the routers on the middle ring 1008, and to the inner ring 1010, highlighting how, where, and when network traffic passes into and out of the enterprise network. As one particular example, the three-dimensional rotation applied in FIG. 12 shows that the internal node 1202 has an alert status regarding network traffic through the router 1204. FIG. 12 also shows that the associated network traffic is occurring with the external endpoint 1206.

FIG. 13 provides another example 1300 of the rotation control. In FIG. 13, the system 110 has responded to operator rotation inputs to provide a better view of certain external nodes, e.g., the external nodes 1302 and 1304. As indicated by the line style, these nodes are involved with potentially anomalous network traffic. Further, the system 110 has rendered a specific alert display 1306 adjacent the external node 1302 in response to operator selection of that external node. The alert panel 1306 may provide any of the alert detail noted above, or a hyperlink to the alert detail noted above, to help the operator understand whether the potentially anomalous network traffic is in fact problematic. FIG. 14 provides an additional example 1400 of the rotation control to provide an enhanced view of the external nodes 1402 and 1404, and an alert panel 1406 displayed in the network graph 1002.

Figure 15:
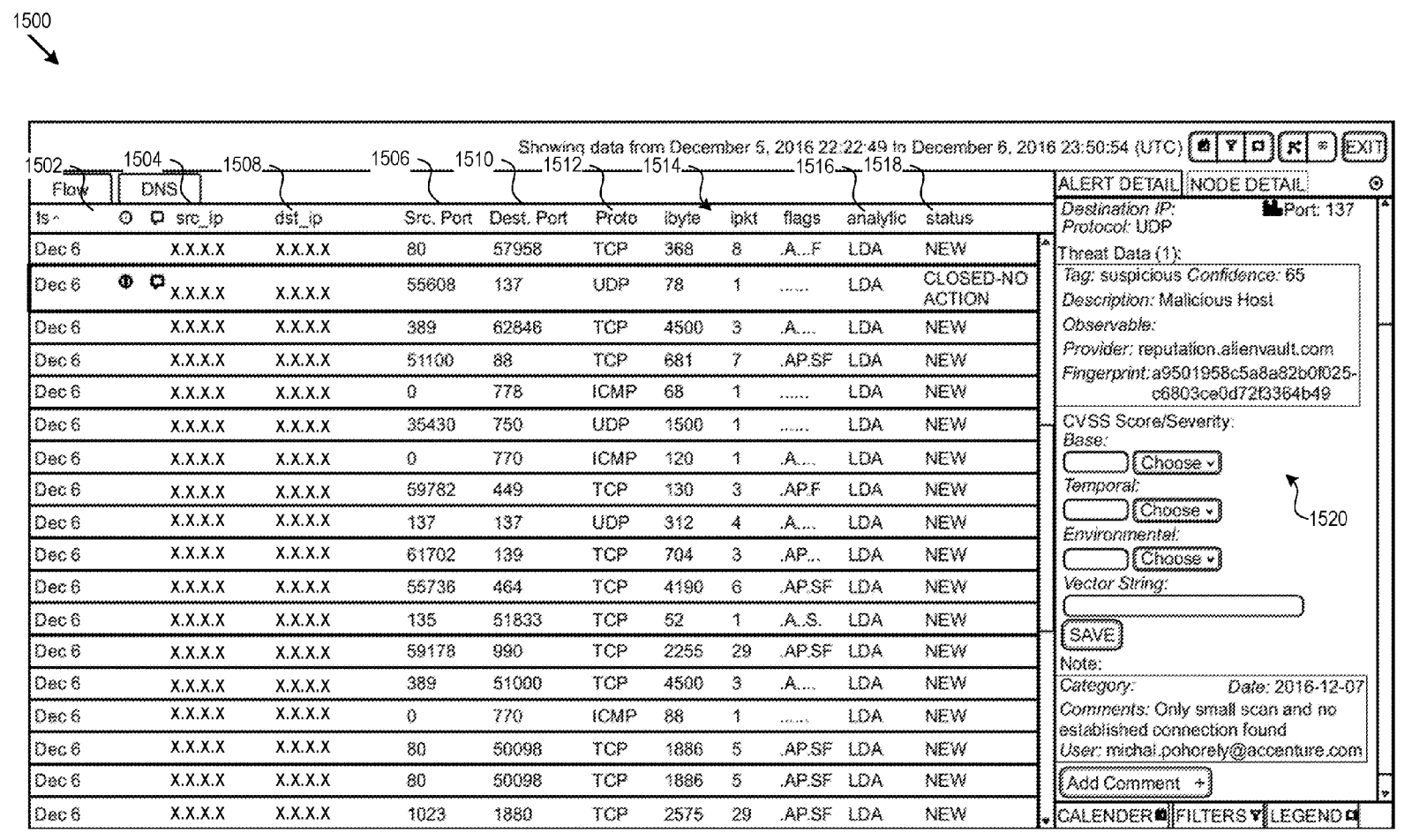

FIG. 15 shows that the system 110 may also provide alert detail in a two-dimensional view, e.g., the alerts list view 1500. The alerts list view 1500 may be a text-centric view that provides information on many alerts in one location in an easy to view format. In that respect, the alerts list view 1500 includes a textual representation of the alerting information displayed on the network graph 1002.

The alert list view 1500 may convey a wide range of information fields. In the example shown in FIG. 15, the alert list view 1500 includes details about each alert and the associated endpoints in sortable columns. Examples of information fields include date 1502, source IP address 1504, source port 1506, destination IP address 1508, and destination port 1510. Additional examples include the communication protocol 1512, and comment and threat intelligence indicators 1514. The information fields also include the detection technique 1516 that identified the alert, and the alert status 1518, e.g., New, Closed—no action, Closed—action taken, Pending review, and the like.

Furthermore, the alert list view 1500 includes a score severity interface 1520. The system 110 accepts threat severity score input through the score severity interface 1520. This provides an efficient mechanism for a threat reviewer to provide feedback on threat severity. In this example, the score severity interface 1520 accepts base, temporal, and environmental score input in keeping with the common vulnerability scoring system (CVSS) framework, including a vector string that provides a textual representation of the metric values.

The system 110 implements a technical analysis of network data to deliver reporting interfaces that reduce cognitive load and more accurately determine network anomalies. As a few examples, the system 110 determines, given raw network data feeds, where connections originated, what protocol was used, how long was the connection, was the connection interactive or one way (and in which direction). The system 110 adds DNS information to identify which web sites are interacting with the enterprise network and which web sites are sending data and which are receiving data. Additional perspective is provided by endpoint data from other data sources. The system 110 layers in and cross references multiple perspectives to allow the operator to better aggressively seek out and terminate malicious actions inside the enterprise network. The system 110 provides a clear picture of historical data and real-time activity and then, as a result of the visualizations, the ability to cognitively predict or anticipate where an attacker may move next.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
   in a network security system:
   establishing a baseline network model for an enterprise network, the baseline network model comprising an expected nominal operational profile for the enterprise network;
   evolving the baseline network model over time to capture changes in the expected nominal operational profile of the enterprise network;
   receiving, with data ingestion circuitry, packet data, network connection data, or both from the enterprise network;
   executing a natural language processor on the packet data, network connection data, or both to identify, in comparison with the baseline network model, a network anomaly within the enterprise network;
   generating a machine interface comprising an alert on the network anomaly; and
   communicating the machine interface to an operator system for review.

2. The method of claim 1, where:
   executing the natural language processor comprises defining a corpus of network characterizing documents for network activity within the enterprise network.

3. The method of claim 1, further comprising:
   receiving network data flow records characterizing network activity within the enterprise network.

4. The method of claim 3, further comprising:
   creating a document comprising the network data flow records; and
   executing the natural language processor on the document to identify the network anomaly.

5. The method of claim 4, where:
   the network data flow records comprise network events defined by source internet protocol address and destination internet protocol address.

6. The method of claim 1, where:
   evolving the baseline network model over time comprises analyzing an overlapping, moving window of network activity.

7. The method of claim 6, further comprising:
aggregating results from analyzing the moving window into the baseline network model to capture the changes in the expected nominal operational profile of the enterprise network.

8. The method of claim 1, where:
generating a machine interface comprises:
generating a visualization of the enterprise network as a network graph and accompanying alert detail panel.

9. The method of claim 1, where:
generating a machine interface comprises:
generating a visualization of the enterprise network as a network graph comprising:
an internal endpoint visualization; and
an external endpoint visualization distinct from the internal endpoint visualization.

10. The method of claim 9, where:
the internal endpoint visualization comprises endpoints within the enterprise network;
the external endpoint visualization comprises endpoints outside the enterprise network;
and further comprising:
connecting internal endpoints in the internal endpoint visualization with endpoints in the external endpoint visualization with visually distinct connectors that vary depending on whether network traffic is anomalous.

11. A system comprising:
a memory operable to store a baseline network model for an enterprise network, the baseline network model comprising an expected nominal operational profile for the enterprise network;
analysis circuitry configured to update the baseline network model over time to capture changes in the expected nominal operational profile of the enterprise network;
data ingestion circuitry configured to receive packet data, network connection data, or both from the enterprise network;
processing circuitry configured to execute a natural language analysis on the packet data, network connection data, or both to identify, in comparison with the baseline network model, a network anomaly within the enterprise network; and
machine interface generation circuitry configured to:
generate a machine interface comprising an alert on the network anomaly; and
communicate the machine interface to an operator system for review.

12. The system of claim 11, where:
the processing circuitry is further configured to define a corpus of network characterizing documents for network activity within the enterprise network.

13. The system of claim 11, where:
the packet data, network connection data, or both comprises network data flow records characterizing network activity within the enterprise network.

14. The system of claim 13, where:
the processing circuitry is further configured to:
create a document comprising the network data flow records; and
execute the natural language analysis on the document to identify the network anomaly.

15. The system of claim 14, where:
the network data flow records comprise network events defined by source internet protocol address and destination internet protocol address.

16. The system of claim 11, where:
the processing circuitry is further configured to:
update the baseline network model over time by analyzing an overlapping, moving window of network activity.

17. The system of claim 16:
the processing circuitry is further configured to:
aggregate results from analyzing the moving window into the baseline network model to capture the changes in the expected nominal operational profile of the enterprise network.

18. The system of claim 11, where:
the machine interface generation circuitry is configured to:
generate a visualization of the enterprise network as a network graph and accompanying alert detail panel.

19. The system of claim 11, where:
the machine interface generation circuitry is configured to:
generate a visualization of the enterprise network as a network graph comprising:
an internal endpoint visualization; and
an external endpoint visualization distinct from the internal endpoint visualization.

20. The system of claim 19, where:
the internal endpoint visualization comprises endpoints within the enterprise network;
the external endpoint visualization comprises endpoints outside the enterprise network;
and where:
the machine interface generation circuitry is configured to:
connect internal endpoints in the internal endpoint visualization with endpoints in the external endpoint visualization with visually distinct connectors that vary depending on whether network traffic is anomalous.

* * * * *